United States Patent [19]
Böhm et al.

[11] 3,850,584
[45] Nov. 26, 1974

[54] FUEL ELEMENT CAN FOR A NUCLEAR REACTOR

[75] Inventors: Horst Böhm, Karlsruhe; Hans Ulrich Borgstedt, Karlsruhe-Waldstadt; Manfred Rühle, Frankfurt am Main; Peter Wincierz, Oberursel, all of Germany

[73] Assignees: Metallgesellschaft Aktiengesellschaft, Frankfurt am Main; Gesellschaft fur Kernforschung mbH, Karlsruhe, both of, Germany

[22] Filed: Mar. 8, 1971

[21] Appl. No.: 121,728

[30] Foreign Application Priority Data
Mar. 7, 1970 Germany.............................. 2010871

[52] U.S. Cl............................. 29/194, 29/196, 176/91
[51] Int. Cl............................................ B32b 15/00
[58] Field of Search............ 75/134 V; 29/183, 193, 29/194, 196, 196.1, 198; 176/91

[56] References Cited
UNITED STATES PATENTS

| | | | |
|---|---|---|---|
| 2,653,117 | 9/1953 | Keene................................ | 29/196.1 |
| 3,384,551 | 5/1968 | Kornbichler..................... | 176/91 R |
| 3,563,728 | 2/1971 | Allio................................. | 176/91 R |
| 3,576,621 | 4/1971 | Keith................................ | 75/134 V |
| 3,597,193 | 8/1971 | Pollack........................... | 75/134 V |
| 3,620,691 | 11/1971 | Rubel................................. | 29/196 |

*Primary Examiner*—Hyland Bizot
*Attorney, Agent, or Firm*—Karl F. Ross; Herbert Dubno

[57] ABSTRACT

A fissionable-fuel element for a nuclear reactor comprises a metallic can or container and a fissionable-fuel material, such as an uranium, plutonium or thorium oxide or other compounds. The can comprises an outer shell of a material having a low neutron-capture cross section but contributing the major part of the structural integrity to the container and an inner lining resisting corrosion by the nuclear fuel. The structural or base material is a vanadium alloy consisting of

| | | |
|---|---|---|
| 40 to 99.7% | by weight | vanadium; |
| 0.1 to 50% | by weight | titanium; |
| up to 1% | by weight | beryllium and/or boron; |
| up to 2% | by weight | each of zirconium and hafnium, but not more than 3% by weight in total; |
| up to 3% | by weight | silicon; |
| up to 10% | by weight | each of aluminum, manganese, iron cobalt, tantalum and tungsten; |
| up to 20% | by weight | each of chromium and molybdenum; |
| up to 30% | by weight | colcombium; |
| 0.03 to 0.4% | by weight | oxygen; and |
| up to 0.2% | by weight | each of nitrogen and carbon, the oxygen, nitrogen and carbon content being in total, not more than 0.4% by weight. |

5 Claims, 2 Drawing Figures

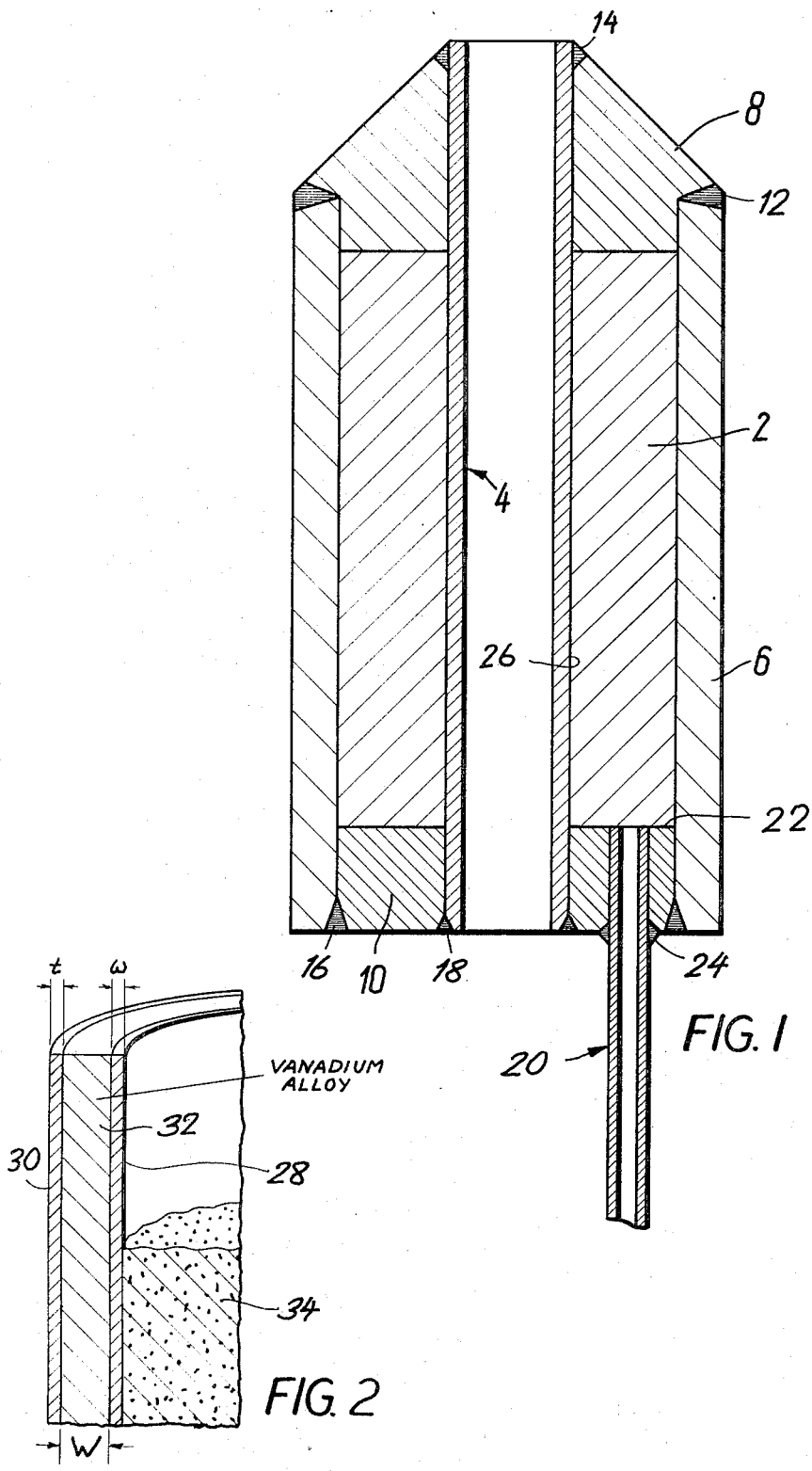

FUEL ELEMENT CAN FOR A NUCLEAR REACTOR

FIELD OF THE INVENTION

Our present invention relates to a fuel element for a nuclear reactor of the type in which a metal can having a low neutron-capture cross section receives a fissionable-fuel material and has an outer surface which may be contacted by a reactor coolant. More particularly, the invention relates to a metal can forming part of such fuel element.

BACKGROUND OF THE INVENTION

A nuclear-reactor core frequently consists of a support structure forming a matrix of removable, replaceable and exchangeable fuel elements which contain fissionable material, hereinafter referred to as a nuclear fuel. The fuel element may include an enclosure for the fuel, frequently in the form of a metal can in which the nuclear fuel is hermetically sealed to prevent the escape of fission fragments or traces of the nuclear fuel into the surrounding coolant. Since such fission fragments include radioactive gases, the enclosures, receptacles or cans for the nuclear fuel must be of a material which resists diffusion of the gaseous fragments to the exterior, must resist cracking and fissure formation under thermal and mechanical stresses which may arise in the reactor, and must be capable of withstanding the mechanical pressures developed in the nuclear reactor core when the cooland is under the superatmospheric or subatmospheric pressures. A discussion of the considerations entering into the design of fuel-element cans may be found at pages 266 *ff* of the *Concise Encyclopaedia of Nuclear Energy*, Interscience Publishers 1962.

The metals which have hitherto been considered for use in a fuel-element can have included materials susceptible to corrosive attack by the fissionable fuel or fission fragments and hence it has been proposed to provide an inner tube of one material and an outer tube, coating or layer of another material. The outer layer may be more resistant to corrosion by the coolant than the inner material and it may be mentioned generally that vanadium alloys have been proposed in contact with the fuel material while steel is provided as an outer material. The vanadium alloy, while having a relatively high resistance to corrosion by the nuclear fuel and fissionable materials, as well as the fission fragments, is not always satisfactory for use in nuclear reactor systems because the resistance to corrosion drops shortly with common reactor fuels such as uranium, plutonium and thorium oxides, nitrides and carbides and mixtures thereof at temperatures above 600°C.

OBJECTS OF THE INVENTION

It is the principal object of the present invention to provide a can or other container for a nuclear fuel which will obviate the disadvantages of the earlier systems mentioned above.

Still another object of the invention is to provide an improved nuclear-fuel element in which the can is less susceptible to internal corrosion, without decreasing the mechanical strength of the container and positively increasing the cost thereof.

It is also an object of this invention to provide an improved fuel element, containing a fissionable fuel such as uranium, plutonium or thorium oxides, carbides and nitrides, or mixtures thereof, which is capable of operating at temperatures above 600°C without significant deterioration of the can or container by nuclear attack.

Yet another object of our invention is to provide an improved can for a nuclear-fuel element of the general character described which has a low neutron-capture cross section, high mechanical strength and considerable resistance to corrosion by nuclear fuel material at temperatures above 600°C.

SUMMARY OF THE INVENTION

We have discovered, most surprisingly, that these objects can be attained effectively by providing a nuclear-fuel element adapted to operate at temperatures of 600°C and higher and containing a fissionable fuel of uranium, plutonium or thorium oxides, carbodes and nitrides, or mixtures thereof, where the fuel-element is a composite structure having an inner layer or lining of a metal resistant to corrosive attack by the fissionable fuel material or fission fragments, surrounded by an outer layer or shell of a vanadium alloy having a low neutron-capture cross section, the vanadium-alloy material providing the structural integrity of the can and preferably having a wall thickness several times greater than the wall thickness of the inner lining. The inner lining may have a wall thickness $w$ such that $2w \leq W \leq 10w$, where $W$ is the wall thickness of the structural vanadium-alloy layer. Hence, the present invention provides a fuel element having a tubular can of a base material of high mechanical strength and low neutron-capture cross section and a metallic inner lining which resists corrosion by the nuclear fuel.

The base material of the fuel-element can of the invention may consist of vanadium alloys having the following composition (all percentages by weight):

| | |
|---|---|
| 40–99.7% | vanadium; |
| 0.1–50% | titanium; |
| 0–1% | each of the elements beryllium and boron; |
| 0–2% | each of the elements zirconium and hafnium, the total of which is not in excess of 3%; |
| 0–3% | silicon; |
| 0–10% | each of the elements aluminum, manganese, iron cobalt, nickel, tantalum, or tungsten; |
| 0–20% | each of the elements chromium and molybdenum; |
| 0–30% | columbium; |
| 0.03–0.4% | oxygen; |
| 0–0.2% | nitrogen; and |
| 0–0.2% | carbon; the total of the elements oxygen, nitrogen, and carbon being not in excess of 0.4%. |

Suitable vanadium alloys (by weight) are:

a. vanadium alloys containing up to 25 percent titanium and up to 5 percent columbium, up to 0.15 percent oxygen, up to 0.1 percent carbon and up to 0.1 percent nitrogen;

b. vanadium alloys containing up to 20 percent chromium or molybdenum, 1–5 percent titanium, 0.03–0.12 percent oxygen, up to 0.1 percent carbon and up to 0.1 percent nitrogen;

c. vanadium alloys containing up to 5 percent titanium and up to 15 percent columbium, .05–0.15 percent oxygen, up to 0.1 percent carbon and up to 0.1 percent nitrogen;

d. high-columbium vanadium alloys containing 25–40 percent columbium, 3–15 percent titanium, 15–25 percent molybdenum, up to 5 percent chromium, up to 3 percent silicon, 0.03–0.12 percent oxygen and up to 0.07 percent of each of the elements nitrogen and carbon, balance vanadium with the usual impurities.

The term "usual impurities" as used herein is intended to define the trace elements normally found in the alloys and resulting from the limitations of the manufacturing and refining methods, the elements being insufficient to affect any substantial property of the alloy.

Particularly suitable vanadium alloys are those containing 1 – 20 percent titanium, 0 – 20 percent columbium, balance vanadium; especially satisfactory are alloys containing 3 percent titanium, 15 percent columbium, balance vanadium, and also including 0.05 – 0.1 percent oxygen and up to 0.05 percent carbon and nitrogen. Such vanadium alloys have an excellent creep strength.

The selection of the inner material of the fuel element can will be governed by the intended use of the composite material. The metallic coating or inner material to be applied will be selected in dependence upon the fuel used in the nuclear reactor.

The content of carbon, nitrogen and oxygen in the inner coating material must be controlled and the content of each of these elements must be less than 0.01 percent. Any content of any of these components in the metallic coating material in excess of 0.01 percent must be transformed into an innocuous form. For the purposes of the invention, carbon, nitrogen and oxygen are considered to be in an innocuous form in compounds which resist the action of the vanadium alloy at high temperatures (working temperature). For instance, a carbon content in excess of 0.01 percent in the inner material can be transformed into innocuous carbides by an addition of ten times its amount of columbium or five times its amount of titanium. A nitrogen content in excess of 0.01 percent can be transformed into innocuous nitrides by an addition of ten times its amount of columbium or five times its amount of titanium. An oxyten content in excess of 0.01 percent can be transformed into an innocous form by an addition of approximately the same amount of aluminum.

The elements zirconium, hafnium, magnesium, calcium, yttrium, the rare earth elements, vanadium and tantalum may also be used to transform one or more of the elements carbon, nitrogen, oxygen into an innocuous form. The resulting finely divided dispersions do not dissolve in the matrix at the processing temperatures and prevent an undesired grain growth in the coating layer. This may be accomplished, e.g., in nickel alloys by a generation and inclusion of columbium carbide or alumina, in which detrimental amounts of carbon and oxygen are combined too.

A composite material according to the invention which is particularly intended for use as a material for tubular cans in nuclear reactors consists of a vanadium alloy base material having a high mechanical strength and an inner coating which is provided on the inside of the tube and resists corrotion by the respective fuel and consists of:

a. pure iron, ferrous alloys or high-grade steels which have a body-centered-cubic crystal lattice at the operating temperature;

b. nickel or cobalt or alloys of nickel and cobalt which contain up to 30 percent of at least one of the elements chromium and molybdenum and up to 10 percent of at least one of the elements titanium, aluminum, columbium, tantalum, the latter being in total not in excess of 50 percent.

In all metallic inner materials used according to the invention, the content of each of the elements carbon, nitrogen and oxygen must not exceed 0.01 percent or the content of any of these elements in excess of 0.01 percent must be present in an innocuous form.

The inner metallic coatings of the composite material which in accordance with the invention is used as a fuel element can generally provide only part of the above-mentioned properties which are desired and required for a reactor material but have a very high resistance to corrosion by at least one of the nuclear-reactor fuels, such as nitrides, carbides or oxides of the elements thorium, uranium or plutonium or mixtures of such compounds. These compounds are used as a fuel in fast-breeder reactors. Particularly suitable ferrous inner-lining alloys are those which have a body-centered-cubic crystal lattice at the operating temperatures of the reactor. Such ferrous alloys consist of 12 – 25 percent chromium, about 0.1 percent carbon and 0.5 percent titanium or 1 percent columbium, balance iron and the usual impurities. The metallic inner-lining material also consist of a coating of iron or ferrous alloy containing up to 30 percent of at least one of the elements chromium, nickel, cobalt and up to 10 percent of one or more of the elements titanium, aluminum, molybdenum, columbium, tantalum, which have a total not in excess of 50 percent. A suitable ferrous alloy consists of 14 – 16 percent chromium, 14 – 16 percent nickel, 0.4 percent titanium, less than 0.1 percent carbon, balance iron. A corrosionresisting inner layer may also consist of molybdenum with the usual grain-refining additions, such as titanium carbide or zirconium carbide.

In accordance with the invention, the tubular fuelelement cans may consist of a vanadium alloy base material and an inner coating of a nickel alloy, for instance, of an alloy containing 21 – 23 percent chromium, 8 – 10 percent molybdenum, 0.4 percent titanium, 0.4 percent aluminum, 3 – 4 percent columbium, 0.1 percent carbon, balance nickel.

For the same purpose, the metallic inner coating of the composite material used in accordance with the invention may consist of zirconium alloys. Suitable zirconium alloys contain 0 – 4 percent of each of the elements copper, vanadium, molybdenum, tungsten, chromium, iron. Where such zirconium alloys are used, it is not always necessary to tansform especially any carbon, nitrogen or oxygen in excess of 0.01 percent into an innocuous form because the compounds formed by zirconium with these elements are so stable that these elements are already in a form which is innocuous for the purpose of the invention. In such cases, commercially pure zirconium alloys containing 0.1 percent oxygen and 0.05 percent carbon may be used directly.

The composite material used in accordance with the invention does not exhibit a satisfactory resistance to corrosion by impure helium and impure sodium and in carbon dioxide and steam, which are used as coolants in nuclear reactors. Unless the can material according to the invention has the required resistance to corrosion by the coolant, the tubular cans will be provided also on the outside with a corrosion-resisting outer coating.

In dependence upon the reactor coolant, the base material of the composite material is provided with an outer coating consisting of a material selected from the group of materials available for the inner coating.

The inner and outer coating may consist of the same material or of different materials; this will depend upon the nuclear fuel and the reactor coolant which are employed. The contents of carbon, nitrogen, and oxygen in the material of the outer coating must also be controlled. Each of these elements must be present in an amount below 0.01 percent. Any content of any of these components in the metallic coating material in excess of 0.01 percent must be transformed into an innocuous form.

For the purposes of this aspect of the invention, carbon, nitrogen and oxygen are considered to be in an innocuous form in compounds which resist the action of the vanadium alloy at high temperatures (working temperatures). For instance, a carbon content in excess of 0.01 percent in the inner material can be transformed into innocuous carbides by an addition of ten times its amount of columbium or five times its amount of titanium. A nitrogen content in excess of 0.01 percent can be transformed into innocuous nitrides by an addition of ten times its amount of columbium or five times its amount of titanium. An oxygen content in excess of 0.01 percent can be transformed into an innocuous form by an addition of approximately the same amount of aluminum.

Hence an embodiment of the invention consists of a fuel-element can which comprises a vanadium alloy base material having high mechanical strength, an inner coating which is provided on the inside of the tube and resists corrosion by the respective fuel, and an outer coating which resists corrosion by the respective coolant and consists of:

a. pure iron, ferrous alloys or high-grade steels, which have preferably a body-centered-cubic crystal lattice at the operating temperature;

b. nickel or cobalt or alloys of nickel and cobalt with chromium, molybdenum, aluminum, titanium, iron, columbium or tantalum; or c. alloys of zirconium with at least one of the alloying elements copper, chromium, vanadium, molybdenum.

The outer coating materials used according to the invention have generally only part of the properties which are desired and required for a reactor material but have a very high resistance to corrosion by at least one reactor coolant such as steam, carbon dioxide, impure helium or impure sodium.

For use in sodium-cooled fast breeders, the invention provides fuel-element cans which comprise a vanadium alloy base material, an inner metallic coating which resists corrosion by nuclear fuel and an outer coating of pure iron. Alternatively, the outer coating may consist of ferrous alloys, particularly if they have a body-centered-cubic crystal lattice at the operating temperatures. Such ferrous alloys comprise 12 – 25 percent chromium, about 0.1 percent carbon and 0.5 percent titanium or 1 percent columbium, balance iron and the usual impurities. Suitable ferrous alloys may alternatively comprise 14 – 16 percent chromium, 14 – 16 percent nickel, 0.4 percent titanium, 0.1 percent carbon, balance iron and the usual impurities. Finally, the metallic outer material for the fuel-element cans, according to the invention, may consist of nickel or cobalt or alloys of nickel or cobalt with up to 30 percent of at least one of the elements chromium, iron, molybdenum and up to 10 percent of at least one of the elements titanium, aluminum, columbium, tantalum, which have a total not in excess of 50 percent.

The fuel-element can according to the invention may alternatively have a corrosion-resisting outer coating consisting of molybdenum or molybdenum alloy. These alloys may contain usual grain-refining additions, such as titanium carbide or zirconium carbide. Molybdenum and high-molybdenum alloys have a high resistance, e.g., to liquid sodium.

Tubular fuel-element cans according to the invention for use in steam-cooled nuclear reactors may comprise a vanadium alloy base material having an inner metallic coating which resists corrosion by the nulcear fuel and an outer coating consisting of a nickel alloy, which comprises, e.g., 21 – 23 percent chromium, 8 – 10 percent molybdenum, 0.4 percent titanium, 0.4 percent aluminum, 3 – 4 percent columbium, 0.1 percent carbon, balance nickel. High-grade steels which are suitable for the same purpose, particularly those having a body-centered-cubic crystal lattice at operating temperatures, comprise, e.g., 12 – 25 percent chromium, up to 0.1 percent carbon, 0.5 percent titanium, balance iron.

For use in reactors in which carbon dioxide is used as a gaseous coolant, the invention provides fuel-element cans which are made from a composite material having a vanadium alloy base material provided with a metallic inner coating which resists corrosion by the nuclear reactor and an outer coating consisting of a high-grade steel. Those high-grade steels are preferred which have a body-centered-cubic crystal lattice at the operating temperature and which comprise, e.g., 12 – 25 percent chromium, up to 0.1 percent carbon and 0.5 percent titanium or 1 percent columbium, balance iron.

For the same purpose, the outer coating of the fuelelement can according to the invention may consist of zirconium alloys. Suitable zirconium alloys contain 0 – 4 percent of each of the elements copper, vanadium, molybdenum, tungsten, chromium, iron. Where such zirconium alloys are used, it is not always necessary to transform especially any carbon, nitrogen and oxygen in excess of 0.01 percent into an innocuous form. In such cases, commercially pure zirconium alloys containing 0.1 percent oxygen and 0.05 percent carbon may be used directly because the compounds formed by zirconium with these elements are so stable that these elements have been transformed into a form which is innocuous for the purposes of the invention.

The fuel-element can be made by conventional processes known per se. These known processes include co-extrusion processes as well as processes in which separate inner and outer tubes are employed and a composite material is made in a shrinking process. Other corrosion-resisting structural parts provided by the invention for contact with the nuclear fuel and comprising vanadium base alloys may also be made by known processes; for instance, rods and other sections may be made by co-extrusion processes and contraction-bonding processes, whereas roll-bonding and explosion-bonding processes may be used to make sheets and plates, strip and sheet bars (slabs).

Certain properties of the vanadium alloy must be taken into account when the inner metallic material and any outer metallic material are applied. For instance, the alloys used according to the invention as corrosion-resisting layers must contain the elements oxygen, carbon, and nitrogen only in small amounts not exceeding 0.01 percent for each of said elements. Particularly under the conditions employed during co-extrusion processes, but also as a result of solid diffusion occurring in annealing processes carried out during the manufacture or during operation at high temperatures, these elements form brittle interlayers with the vanadium alloys and these interlayers may inhibit a subsequent cold-working of the composite material without formation of cracks. If said impurities in the starting material are inevitable, suitable elements must be added to transform said impurities into compounds which do not react with vanadium under the conditions stated. For instance, the carbon content of commercial ferrous or nickel alloys may be transformed into innocuous carbides of columbium or titanium in stoichiometric amounts. Relatively high temperatures are employed during the shaping of vanadium alloys to form shaped parts of the composite material according to the invention, e.g., temperatures above 1,100°C during co-extrusion processes and above 1,000°C during process annealing. Under these conditions, the corrosion-resisting inner and outer layers used according to the invention tend to exhibit grain coarsening. Coarse-grained materials cannot be machined or have poor machining properties. An undesired grain growth may be prevented by finely divided, stable dispersions, which do not dissolve in the matrix at the temperatures which are employed. In nickel alloys, this effect may be accomplished, e.g., by the use of columbium carbide or alumina. In these compounds, the undesired contents of carbon and oxygen have been combined in an innocuous form.

DESCRIPTION OF THE DRAWING

FIG. 1 is a vertical cross section of an assembly for making a nuclear reactor can in accordance with the present invention; and FIG. 2 is a fragmentary cross-sectional view of a portion of this can.

In FIG. 1, we show an assembly adapted to be extruded and expanded to form a nuclear reactor can. The assembly comprises a tubular body 2 of a vanadium-alloy base material as described previously, in the interior of which is received a tubular inner lining 4 or the inner lining material resistant to corrosion by the fissionable fuel. The assembly is surrounded by a sleeve 6 of stainless steel which is welded at 12 to a conical cap 8 of stainless steel. The latter is welded in turn to the inner lining 4 at 14. The rear end of the assembly is closed by a disk 10 of stainless steel which is welded at 16 to the outer sleeve 6 and 18 to the inner lining 4. The assembly is evacuated prior to extrusion by a tube 20 terminating at the interface 22 between the disk 10 and the tubular body 2. Since the welds 12, 14, 16 and 18 are hermetic seals and a similar seal is provided at 24 between the tube 20 and the disk 10, the assembly can be evacuated through the tube 20 which can then be pinched off prior to extrusion. The evacuation removes air also from the interface 26 between the inner lining material and the outer member 2. The resulting assembly, hereinafter termed a slug or pin, can be extruded in a ratio of 10 to 1 to form the can. The stainless steel members 6, 8, 10 can then be removed and a further lining (outer lining) provided upon the can, e.g. by shrinking a sleeve of a material corresponding to the innerlining material thereon.

A portion of the completed can has been shown in FIG. 2 wherein the inner lining is represented at 28 and is composed of one of the inner lining materials mentioned earlier. The inner lining has a thickness $w$ which may be equal to the thickness $t$ of the outer lining 30, the latter being constituted of a material from the same group and selected to be resistant to corrosion by the nuclear reactor coolant. Sandwiched between the inner and outer lining, is the vanadium-alloy base material 32 with a thickness $W = 2w$ to $10w = 2t$ to $10t$. The fissionable fuel is represented at 34 and may be in the form of a ceramic-like mass, particles or ceramic-coated particles, all of which are conventional in nuclear-fuel technology.

SPECIFIC EXAMPLES

In each of the following Examples, the metal can was formed as described in connection with FIG. 2 and sealed to enclose a nuclear fuel, i.e., uranium oxide, uranium carbide, uranium nitride, plutonium oxide, plutonium nitride, plutonium carbide, thorium oxide, thorium nitride or thorium carbide.

The invention will be explained more fully in the subsequent examples:

EXAMPLE 1

A tubular fuel-element can for a nuclear reactor fuel element, which can resists corrosion by nuclear fuel, is made as follows from the composite material used according to the invention:

A circular section pin 2 is provided, which has a suitable axial bore and consists of a vanadium alloy comprising 3 percent titanium, 0.06 – 0.08 percent oxygen, 0.03 percent carbon and nitrogen, 15 percent columbium, balance vanadium. A soft iron tube 4 is inserted into said pin (see FIG. 1). That inner tube consists of Armco iron containing 0.2 percent aluminum and 0.5 manganese. That material contains only innocuously small amounts of carbon (0.001 percent C when remelted in a high vacuum) and less than 0.01 percent nitrogen. A Armco iron contains 0.1 – 0.2 percent oxygen, which by additions of aluminum and manganese is transformed into a form which is innocuous for the subsequent machining. The soft iron tube 4 is vacuum-tightly welded to an oxidation-resisting wrapper, which is made of stainless steel and consists of parts 6, 8 and 10. The resulting assembly is evacuated through the tube 12, which is then squeezed off and closed by welding. All parts are cleaned and degreased before they are welded. That duplex pin is extruded with a ratio of 10:1 to form a tube. To ensure that the forces required to deform the vanadium alloy having a high strength at high temperatures will not be excessive, the pin is heated to at least 1,000°C for the extrusion step. The temperature of the pin should not exceed 1,350°C, however, in order to avoid the occurrence of wide reaction zones between the coating material and the vanadium alloy. The oxidationresisting shell of stainless steel is subsequently removed.

The resulting duplex tube is descaled and subjected to a softening vacuum anneal and is subsequently subjected to further processing by known methods, such as cold power spinning or tube drawing. The cold work hardening is eliminated by vacuum annealing at temperatures above 1,000°C. The divided alumina which is contained in the soft iron prevents a disturbing coarsening of the grain during these annealing treatments and during the extrusion process.

The can combines the desirable properties of the vanadium alloy, namely, a high creep strength, a high neutron economy, and the absence of high-temperature embrittlement under irradiation with neutrons, with the desirable behavior of pure iron in contact with nuclear fuels so that the can may be used to great advantage in nuclear fuel elements in fast breeders. The pure iron used in the example may be replaced by molybdenum. Because the mechanical properties of molybdenum differ from those of the vanadium alloy less than those of pure iron, the manufacture of a vanadium tube having an inner coating of molybdenum involves less difficulties in some manufacturing stages; specifically, it is simpler to ensure that the two layers are concentric and circular.

The inner coating may alternatively consist of the usual stainless steels, the carbon and nitrogen contents of which have been rendered innocuous by an addition of titanium or columbium or tantalum. Owing to their mechanical properties, they can be manufactured more easily. They also differ from pure iron in that they do not rust when exposed to air in storage.

EXAMPLE 2

Sheets and plates made from the composite materials according to the invention may be used with success as semi-finished products for contacting nuclear fuels.

For instance, a sheet metal element consisting of a vanadium alloy which comprises 3 percent titanium, 1 percent silicon, 0.08 percent oxygen and up to 0.05 percent of each of the elements nitrogen and carbon, balance vanadium, is placed between two sheet metal elements consisting of a nickel alloy which comprises 21 percent chromium, 9 molybdenum, 18 percent iron, 0.5 percent tungsten, balance nickel. An oxidation-resisting wrapper is placed around said pile. It is suitable to scatter berylium oxide between the oxidation-resisting wrapper and the nickel alloy so that the wrapper can subsequently be removed more easily. The oxidation-resisting wrapper is air-tightly closed by welding and the whole assembly is rolled with a reduction of at least 50 percent in one pass at 1,100°C. As a result, the nickel alloy is welded to the vanadium alloy to form a satisfactory metallic bond whereas the oxidationresisting wrapper can easily be removed. The composite material can then easily be cold-formed with suitable process annealing.

The composite materials according to the invention combine the excellent creep behavior and irradiation response of vanadium alloys with the desirable resistance to corrosion of other materials.

The creep behavior of the several materials is apparent from the following Table I.

TABLE I

| Composition of Alloy in % by weight | $\sigma_B$ in kg/cm² after 10,000 hours at 650°C | 850°C |
|---|---|---|
| Chromium 16.5, nickel 13.5 molybdenum 1.3, carbon up to 0.1, columbium up to 1, vanadium 0.7, balance iron | 14.5 | — |
| Chromium 17, nickel 12, molybdenum 2.5, carbon up to 0.08, balance iron | 12.5 | 2 |
| Chromium 12, carbon up to 0.1, balance iron | 8 | — |
| Chromium 22, molybdenum 9, titanium 0.4, aluminum 0.4, columbium 3, carbon up to 0.1, iron up to 5, balance nickel | 30 | — |
| Titanium 3, silicon 1, balance vanadium | 35 | 4 – 5 |
| Titanium 3, columbium 15, balance vanadium | 30 | 2 – 3 |
| Titanium 3, chromium 15, balance vanadium | 42 | — |

The irradiation response of various materials may be described by the loss of ductility which is stated in the following Table II:

TABLE II

| Group of Materials | Loss of Ductility by Irradiation with Neutrons at 600 – 750°C |
|---|---|
| Austenitic steels and nickel base alloys | 50 – 95% |
| Ferritic chromium steels | Embrittlement lower than that of austenitic steels but still appreciable |
| Vanadium alloys | No appreciable loss of ductility. |

The following Tables III, IV and V reveal the improved resistance of the composite material according to the invention, particularly for tubular cans, to corrosion by reactor coolants. In the tables, the resistance of the outer material to corrosion is compared to that of the vanadium alloy base material.

TABLE III

| Material | Loss Due to Corrosion by Flowing Sodium at 600°C (Oxygen Content 5 – 10 ppm) |
|---|---|
| VTi3Nb15 | 120 × 10⁻⁵ mg/cm² h |
| Pure iron | 3 × 10⁻⁵ mg/cm² h |
| Molybdenum containing 1% titanium carbide and zirconium carbide | 15 × 10⁻⁵ mg/cm² h |
| Stainless chromium steels and chromium nickel steels | approximately as with pure iron |

TABLE IV

| Composition of Material in % by weight | Removal of Material in Steam in 3 Years (Microns) at a Steam Temperature of | | |
|---|---|---|---|
| | 565°C | 620°C | 705°C |
| Molybdenum 9, chromium 22, aluminum 0.4, titanium 0.4, carbon up to 0.1, columbium 3, balance nickel | 2.5 | 2.5 | 23 |
| Stainless chromium nickel steels | 2.5 | 25 | |
| Vanadium alloys | are decomposed within a few hours under these conditions | | |

TABLE V

| Composition of Material | Increase in Weight in Carbon Dioxide Gas in mg/cm² h at | | |
|---|---|---|---|
| | 700°C | 900°C | 1000°C |
| Stainless austenitic chromium nickel steels 22% chromium, 9% molybdenum, 18% iron, 0.5% tungsten, balance nickel | — | $2 \times 10^{-3}$ | |
| 20% chromium 0.4% titanium, balance nickel | — | $0.4 \times 10^{-3}$ | $1 \times 10^{-3}$ |
| 3% titanium, 15% columbium, balance vanadium | — | $1 \times 10^{-3}$ | — |
| | $3.5 \times 10^{-3}$ after 2000 hours; then the oxide layer flakes off | | |

We claim:

1. A fuel-element can for a nuclear reactor comprising a body of vanadium-alloy base material of high mechanical strength and a metallic inner lining which resists corrosion by nuclear fuel extrusion-bonded to said body of said base material, said vanadium-alloy base material consisting essentially by weight of the following:

| | |
|---|---|
| 40–99.7% | vanadium; |
| 0.1–50% | titanium |
| 0–1% | each of the elements beryllium and boron; |
| 0–2% | each of the elements zirconium and hafnium; the total of which is not in excess of 3%; |
| 0–3% | silicon; |
| 0–10% | each of the elements aluminum, manganese, iron, cobalt, nickel, tantalum, or tungsten; |
| 0–20% | each of the elements chromium and molybdenum; |
| 0–30% | columbium; |
| 0.03–0.4% | Oxygen; |
| 0–0.2% | nitrogen; and |
| 0–0.2% | carbon; the total of the elements oxygen, nitrogen and carbon being not in excess of 0.4%, | said lining being selected from the group which consists essentially of a. pure iron, ferrous alloys of high-grade steels having a body-centered-cubic-crystal lattice at the operating temperature and containing up to 30 percent by weight of at least one of the elements chromium, nickel and cobalt and up to 10 percent by weight of at least one of the elements titanium, aluminum, molybdenum, columbium, and tantalum, in a total amount up to 50 percent by weight;

b. nickel, cobalt and alloys of nickel or cobalt with up to 30 percent by weight of at least of one of the elements chromium, iron, molybdenum, cobalt and up to 10 percent by weight of at least one of the elements titanium, aluminum, columbium, tantalum, which have a total not in excess of 50 percent; and c. zirconium alloys with up to 4 percent by weight of each of the alloying elements copper, vanadium, molybdenum, chromium, iron and tungsten, which elements are present in total up to 6 percent by weight, carbon, nitrogen or oxygen being present in said lining in an amount by weight below 0.01 percent or any content of carbon, nitrogen or oxygen in excess of 0.01 percent by weight being present in an innocuous form.

2. The fuel element can defined in claim 1 wherein said vanadium-alloy base material consists by weight of 0.5 to 20 percent titanium, 0.0 to 20 percent columbium, 0.03 to 0.3 percent oxygen, up to 0.1 percent nitrogen.

3. The fuel-element can defined in claim 1, further comprising an outer lining on said base material which consists of a metal or metal alloy selected from the group of materials which are available for the inner coating and resistive to corrosion by the reactor coolant.

4. The fuel-element can defined in claim 1 wherein said body is cylindrical and consists of a vanadium alloy essentially consisting by weight of 3 percent titanium, 0.06 to 0.08 percent oxygen, 0.03 percent carbon and nitrogen, 15 percent columbium and the balance vanadium, said liner consisting of ARMCO iron with 0.2 percent by weight aluminum, 0.5 percent by weight magnesium and less than 0.01 percent by weight nitrogen, said can being extruded at a ratio of 10:1 at a temperature between 1,000° C. and 1,350° C. to bond the lining to the body.

5. The fuel-element can defined in claim 1 and formed from a sheet metal element adapted to constitute said body and consisting by weight of 3 percent titanium, 1 percent silicon, 0.08 percent oxygen and up to 0.05 percent each nitrogen and carbon, the balance being vanadium, said lining consisting by weight of 21 percent chromium, 9 percent molybdenum, 18 percent iron, 0.5 percent tungsten and the balance nickel, the nickel alloy being bonded to the vanadium alloy by molding them together with size reduction at a temperature of about 1,100° C.

* * * * *